United States Patent [19]
Croft et al.

[11] Patent Number: 6,078,826
[45] Date of Patent: Jun. 20, 2000

[54] MOBILE TELEPHONE POWER SAVINGS METHOD AND APPARATUS RESPONSIVE TO MOBILE TELEPHONE LOCATION

[75] Inventors: Thomas M. Croft, Cary; Paul Dent, Pittsboro, both of N.C.

[73] Assignee: Ericsson Inc., Research Triangle Park, N.C.

[21] Appl. No.: 09/086,873

[22] Filed: May 29, 1998

[51] Int. Cl.[7] .................................................. H04B 1/38
[52] U.S. Cl. .......................................... 455/574; 455/522
[58] Field of Search ...................................... 455/421, 522, 455/574, 55.3, 38.3, 343, 456, 457, 422, 420, 426, 552, 509, 520

[56] References Cited

U.S. PATENT DOCUMENTS

| | | | |
|---|---|---|---|
| 4,903,319 | 2/1990 | Kassai et al. | 455/574 |
| 5,425,030 | 6/1995 | Comroe et al. | 455/509 |
| 5,541,976 | 7/1996 | Ghisler | 455/426 |
| 5,568,513 | 10/1996 | Croft et al. . | |
| 5,574,771 | 11/1996 | Driessen et al. | 455/31.2 |
| 5,590,396 | 12/1996 | Henry | 455/574 |
| 5,594,951 | 1/1997 | Bellin | 455/343 |
| 5,701,329 | 12/1997 | Croft et al. . | |
| 5,715,278 | 2/1998 | Croft et al. . | |
| 5,799,256 | 8/1998 | Pombo et al. | 455/574 |
| 5,806,007 | 9/1998 | Raith et al. | 455/574 |
| 5,842,141 | 11/1998 | Vaihoja et al. | 455/574 |
| 5,900,838 | 5/1999 | Khan et al. | 455/457 |
| 5,914,947 | 6/1999 | Saito | 370/337 |
| 5,953,677 | 9/1999 | Sato | 455/574 |

*Primary Examiner*—William G. Trost
*Assistant Examiner*—Jean A. Gelin
*Attorney, Agent, or Firm*—Jenkens & Gilchrist

[57] ABSTRACT

A mobile telephone able to save power in response to the position of the mobile telephone is disclosed. Location circuitry within the mobile telephone enables the establishment of one or more deep-sleep locations associated with a mobile telephone. When the location circuitry determines that the current location of the mobile telephone is within a selected distance of one of the deep-sleep locations, the mobile telephone operates according to a low power mode of operation wherein only a timer enabling periodic updates of the mobile telephone's position is active. If the location circuitry determines that the mobile telephone is not within a selected distance of one of the predetermined locations, the mobile telephone operates in a standby mode which utilizes more power than the deep-sleep mode but still conserves battery power and enables the mobile telephone to receive calls.

20 Claims, 4 Drawing Sheets

6,078,826

MOBILE TELEPHONE POWER SAVINGS METHOD AND APPARATUS RESPONSIVE TO MOBILE TELEPHONE LOCATION

BACKGROUND OF THE INVENTION

1. Technical Field of the Invention

The present invention relates to power saving measures within a mobile telephone, and more particularly, to power saving measures responsive to a location of a mobile telephone.

2. Description of Related Art

Over the past several years, the convenience and popularity of mobile telephones have caused a drastic increase in their use. Mobile telephones enable a user to maintain communications when they are away from locations where they may be easily contacted by existing land line telephones. Mobile telephones enable an individual to be easily contacted when they are out shopping, driving in the car, or at other locations where land line communications are not possible.

One of the greatest limitations with mobile telephones is their ability to provide a continuous power source for extended periods of time. This has lead to the practice of mobile telephone users turning off their mobile phone when they arrive at their home or office to conserve battery power because existing land line telephones may be used at these locations. While the process of turning on and off the cellular telephone is effective in conserving battery power, many users will forget to turn on their mobile telephones when they leave their home or office causing them to potentially miss important calls from family, friends and business associates.

One solution to this problem has been creating a standby state for a mobile telephone when the telephone is turned on but not handling a call. When in the standby state, the mobile telephone typically operates in a power saving condition which periodically checks the control channel for incoming calls. The remainder of the time, the mobile telephone powers down most of its circuitry to conserve battery power. This technique extends the standby time of the mobile telephone considerably over a situation when the mobile telephone is merely turned on. Examples of prior art type power saving devices of this type are described in U.S. Pat. No. 5,568,513 to Croft, et al. and U.S. Pat. No. 5,701,329 issued to Croft, et al.

A shortcoming of the standby mode power savings method is that battery power is still depleted quickly enough that a user may feel the need to turn off the mobile telephone when entering an environment where a different telephone will be used. Since it is easy for the user to forget to turn the phone back on again, the same problem of potentially missing an important call may arise. Thus, some means for further conserving battery power over existing standby mode operating conditions is desired.

SUMMARY OF THE INVENTION

The present invention overcomes the foregoing and other problems with a method and system for enabling a mobile telephone to save battery power based upon the location of the mobile telephone. The mobile telephone includes an apparatus for determining the current position of the mobile telephone (such as GPS circuitry). This apparatus reports the phone's current position, and additional software, circuitry, etc. within the mobile telephone determines whether the location is within a selected distance of a predetermined location. The location circuitry within the mobile telephone enables a user to enter a number of predetermined locations designating where the mobile telephone is to operate in a first deep-sleep mode of operation. The location circuitry periodically determines whether the current location of the mobile telephone is within a selected distance of the predetermined locations. When a mobile telephone is located within a predetermined distance of one of the selected locations, the mobile telephone operates in the first deep-sleep or low power mode of operation wherein only a timer is powered within the mobile telephone. The timer periodically powers up the other mobile telephone circuitry to enable the mobile telephone to redetermine its present location. When the location circuitry determines that the mobile telephone does not lie within a preselected distance of the selected locations, the mobile telephone will operate in a second standby mode of operation. This mode of operation utilizes more power than the deep-sleep mode of operations, but enables the mobile telephone to receive incoming calls.

The location determination process may be further based upon a determination of whether the mobile telephone is currently being served by a base station that is associated with the preselected locations. If so, the specific location determination of the mobile telephone is determined more precisely using GPS. Otherwise, a location determination can be delayed until a base station is contacted that may put the user within the selected distance of one of the predetermined locations.

The mobile telephone unit may further be configured to automatically enter a call forwarding state when the mobile telephone enters the deep-sleep mode of operation. In response to entry of this mode of operation, the mobile telephone contacts a service provider and activates call forwarding for calls to the mobile telephone to a telephone number associated with the predetermined location. When the mobile telephone determines that the unit has left the deep-sleep mode area of operation, the mobile telephone cancels the call forwarding functionality.

BRIEF DESCRIPTION OF THE DRAWINGS

For a more complete understanding of the present invention, reference is made to the following Detailed Description taken in conjunction with the accompanying drawings wherein.

DETAILED DESCRIPTION OF THE INVENTION

Figure 1:
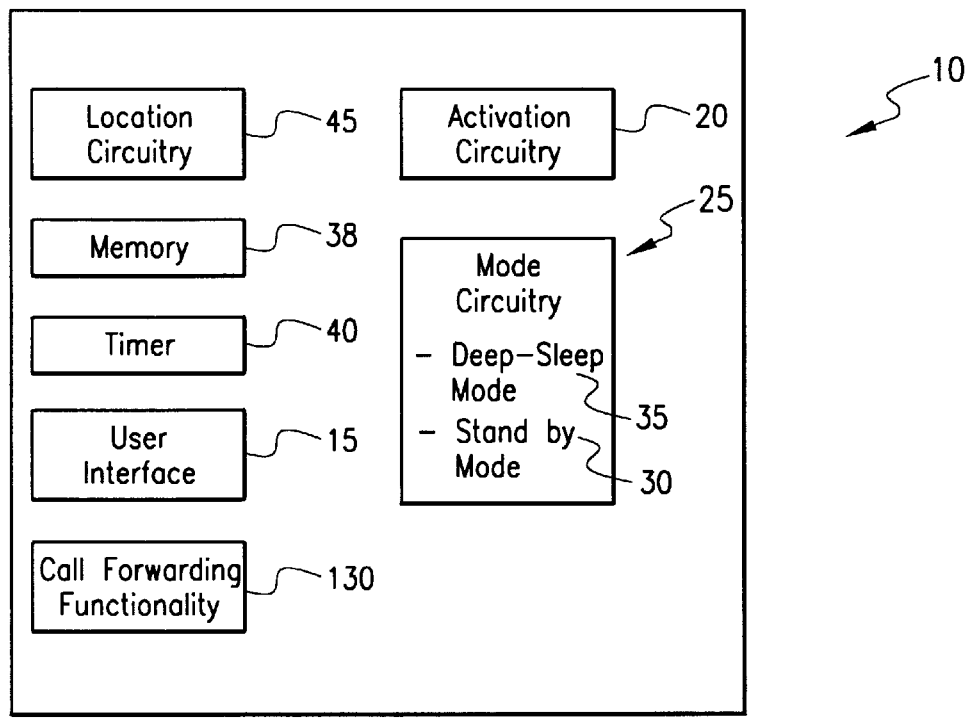
FIG. 1 is a functional block diagram of a mobile telephone employing the location dependent power saving method and apparatus of the present invention.

Referring now to the Drawings, and more particularly to FIG. 1, there is illustrated a functional block diagram of a mobile telephone 10 including circuitry for determining location specific information of the mobile telephone. A user interface 15 enables an individual to enter information to activation circuit 20 that activates the mode circuitry 25 to operate the mobile telephone 10 in two modes of operation. The activation circuitry 20 may be implemented in a variety of manners. For example, a dedicated push button or key pad within the user interface 15 may send signals to the activation circuitry 20 in response to pressing of the buttons or keypads in the usual manner. Other possibilities include, but are not limited to, a software menu driven selection option, a sequence of key presses or voice activation.

One mode of operation comprises a standby mode 30 wherein the mobile telephone 10 powers down most of its circuitry to conserve battery power, but periodically checks for pages (incoming calls) to the mobile telephone. The deep-sleep mode of operation 35 causes all circuitry of the mobile telephone 10 to shutdown except for a timer 40 and the mobile telephone may not receive calls. The mode circuitry 25 also enables a user to select a particular time period for which the mobile telephone will remain in the deep-sleep mode of operation (for example, 5, 10 or 15 minutes). The timer 40 times this indicated period of time before attempting to determine a new location of the mobile telephone 10.

Location circuitry 45 enables a determination of the position of the mobile telephone 10. This location circuitry 45 may be implemented in a variety of manners, including the use of GPS or other types of terrestrial signals. The only requirement is that the location circuitry 45 be able to determine the position of the mobile telephone 10 within a selected range, for example, 100 meters. The location circuitry 45 also is responsive to user inputs from the user interface 15 to accept specified locations as being associated with the deep-sleep mode 35 of operation of the mobile telephone 10. The specified locations are stored within a memory 38.

Figure 2:
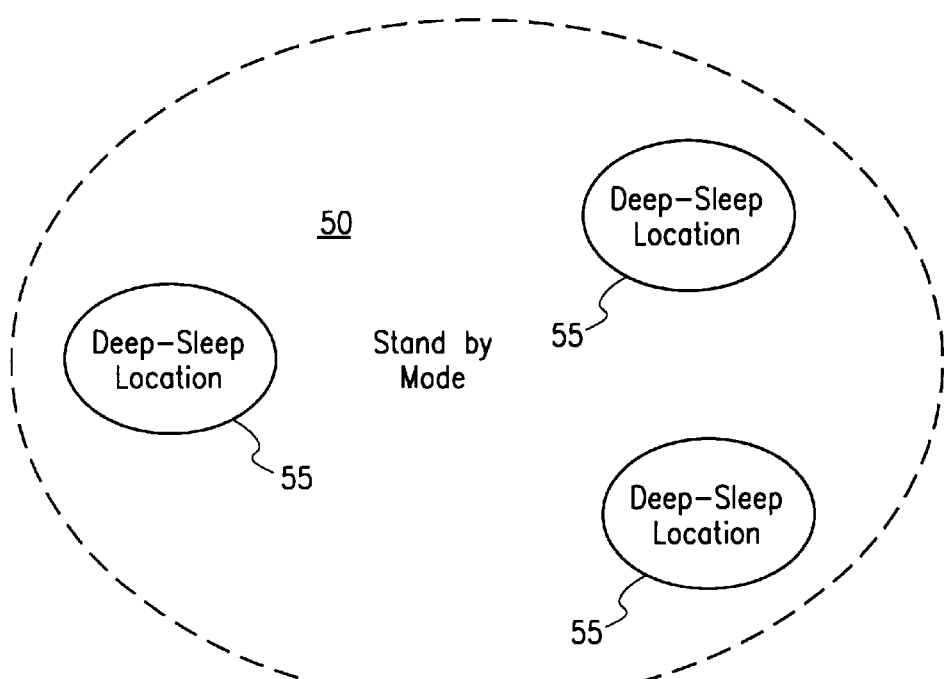
FIG. 2 illustrates the deep-sleep and standby areas of operation according to the present invention.

Referring now also to FIG. 2, there are illustrated the areas of operation of a mobile telephone 10 according to the present invention. When the location circuitry 45 determines that the mobile telephone 10 is located within an area 50 not designated as a selected location, the mobile telephone will operate in the standby mode of operation 30 wherein battery power is consumed at a higher rate but the mobile telephone may receive calls. When the location circuitry 45 determines that the mobile telephone 10 is located within an area 55 denoted as a deep-sleep area of operation 35, the mobile telephone converts to the deep-sleep mode 35 of operation, utilizes substantially less power and may not receive calls. The timer 40 periodically activates the location circuitry 45 to determine whether the mobile telephone 10 has moved from the deep-sleep area 55 into a standby mode area 50.

Figure 3:
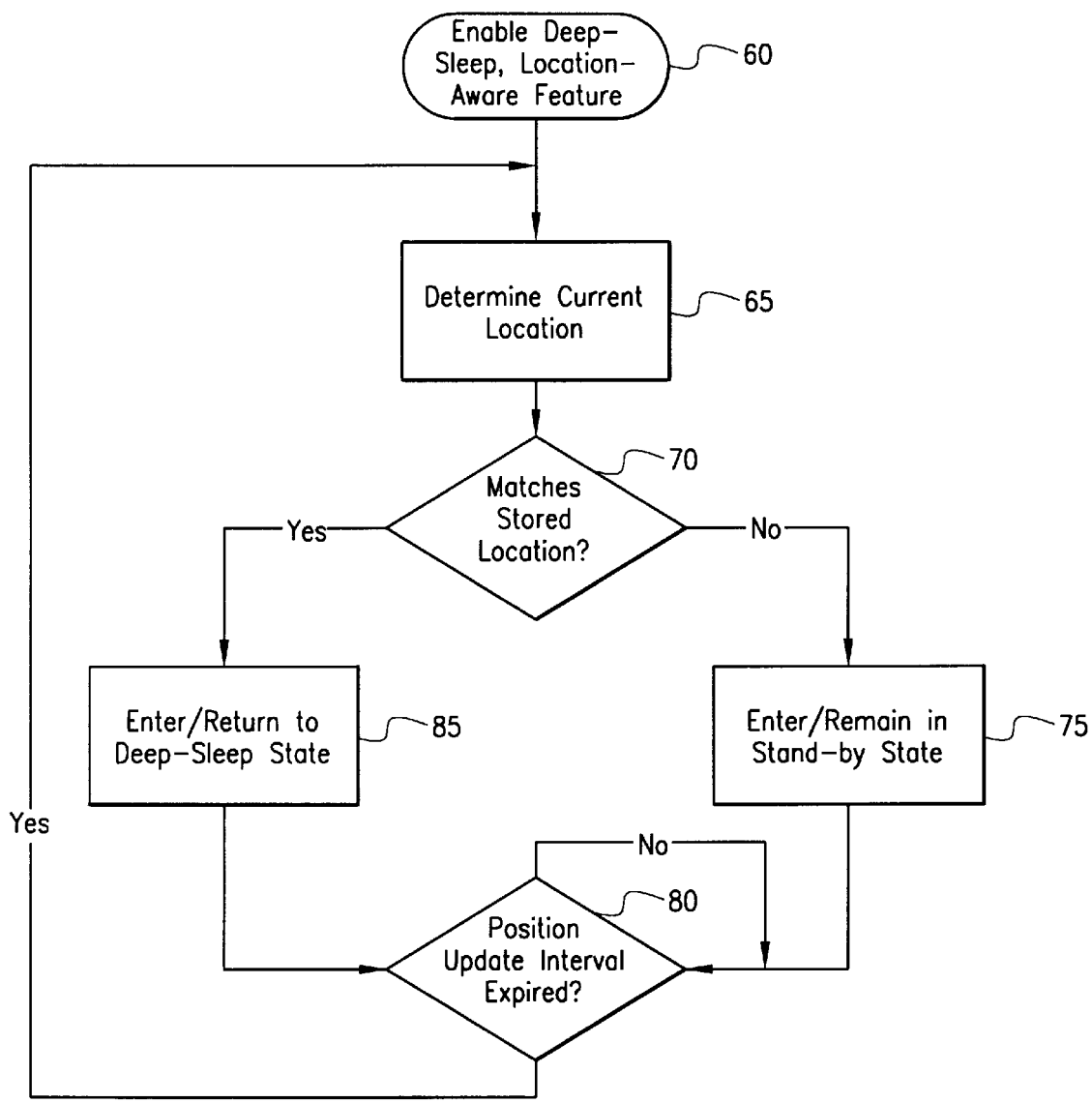
FIG. 3 is a flow diagram illustrating the operation of a deep-sleep mode of operation in a mobile telephone.

Referring now to FIG. 3, there is illustrated the method of operation of a mobile telephone according to the present power saving, location dependent method. Once a user enables the deep-sleep feature at step 60 using the activation circuitry 20, the location circuitry 45 will determine at step 65 the current location of the mobile telephone 10. The location circuitry 45 next determines at inquiry step 70 whether the current location matches (or is within a selected distance of) one of the stored deep-sleep locations entered by a user. If not, the mobile telephone 10 either enters or remains in the standby state at step 75. If inquiry step 70 determines that the current user location is within a selected distance of a stored deep-sleep location, the mobile telephone 10 enters the deep-sleep state at step 85 and control passes to inquiry step 80 to monitor for expiration of the timer period. Inquiry step 80 utilizes the timer 40 to monitor for the expiration of a selected time period indicating an update of the position of the mobile telephone 10 is necessary.

In an additional embodiment, the power savings within a mobile telephone 10 may be further increased by storing within the memory 38 associated with the location circuitry 45 the system IDs of base stations associated with each deep-sleep location 35. In this manner, if the location circuitry 45 determines that the current base station system ID does not match any of the IDs stored within the memory 38, there is no need to determine the present location of the mobile telephone 10 using GPS or other sophisticated means. Thus, the mobile telephone 10 need only determine its location when it is in communication with a base station associated with a deep-sleep location.

Figure 4:
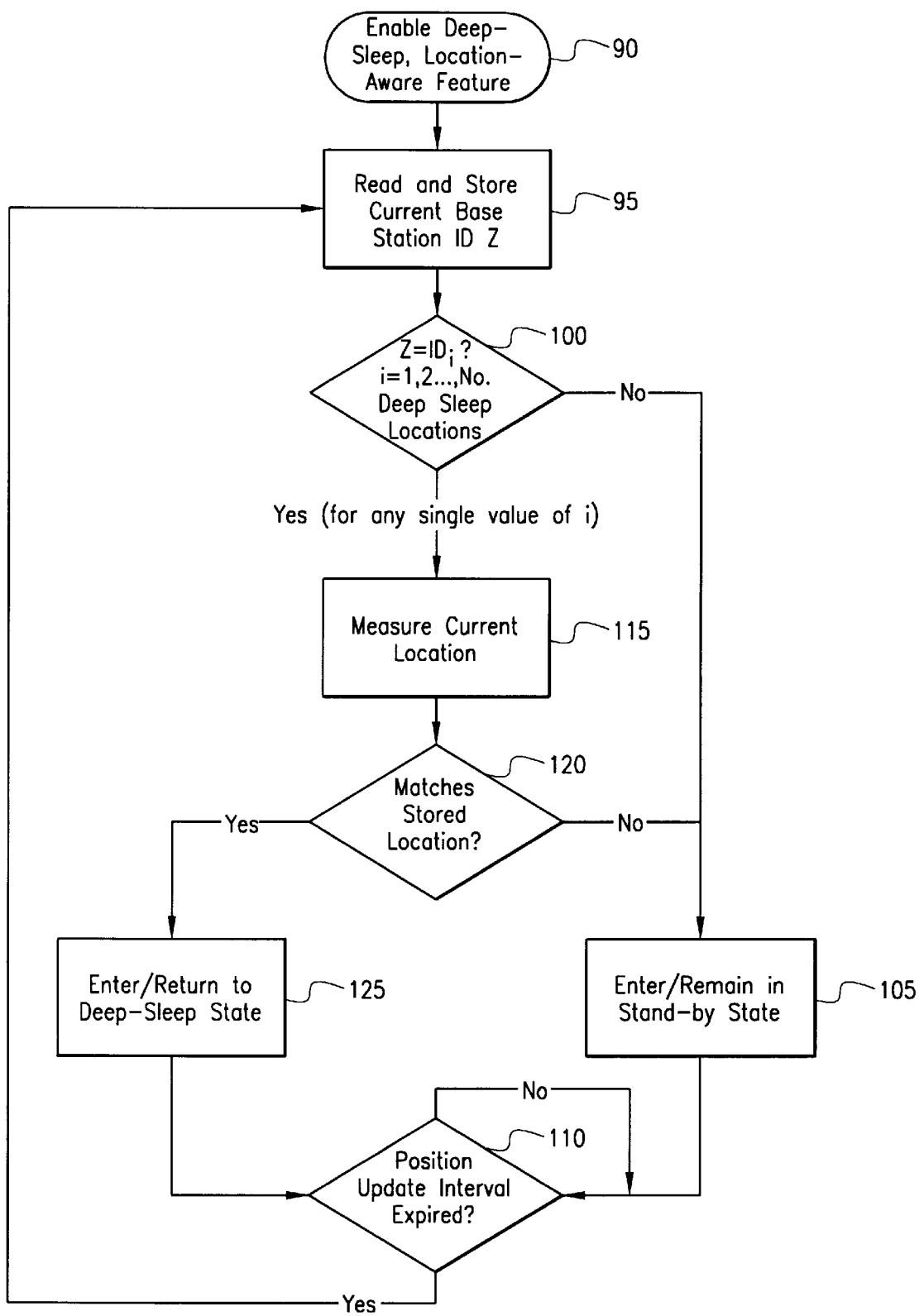
FIG. 4 is a flow diagram illustrating an alternative embodiment of the present invention wherein the deep-sleep mode is only initiated upon detection of particular base station ID.

Referring now to FIG. 4, a flow diagram more fully describes this embodiment of the invention. The user must initially implement the deep-sleep mode 35 feature of the mobile telephone at step 90. The location circuitry 45 of the mobile telephone 10 reads the system ID of the currently accessed base station at step 95. Inquiry step 100 determines if the system ID of the currently accessed base station matches one of the base station system IDs stored within the memory 38 associated with the location circuitry 45. If not, the mobile telephone either enters or remains in the standby mode at step 105 and waits until a next update period is needed at inquiry step 110.

If inquiry step 100 determines that the current base station system ID is one of the deep-sleep location system IDs, the location circuitry 45 determines at step 115 the current location of the mobile telephone 10. Inquiry step 120 determines whether the mobile telephone 10 actually resides within one of the deep-sleep locations, and if so, the mobile telephone 10 remains in or enters a standby state 30 at step 105. Otherwise, the mobile telephone 10 will return or enter into the deep-sleep state at step 125 and remain there until inquiry step 110 determines the need for a further update.

Another functionality which may be associated with the mobile telephone 10 is a call forwarding functionality 130 (FIG. 1). The call forwarding functionality 130 enables a user to enter a telephone number to which calls to the mobile telephone 10 will be forwarded whenever the mobile telephone is in a deep-sleep mode 35. Thus, when an individual is attempting to contact the user via the mobile telephone 10, and the user is in one of its deep-sleep locations 55, such as their home or the office, the call will be forwarded to either the home or the office as directed by the user indicated location.

Figure 5:
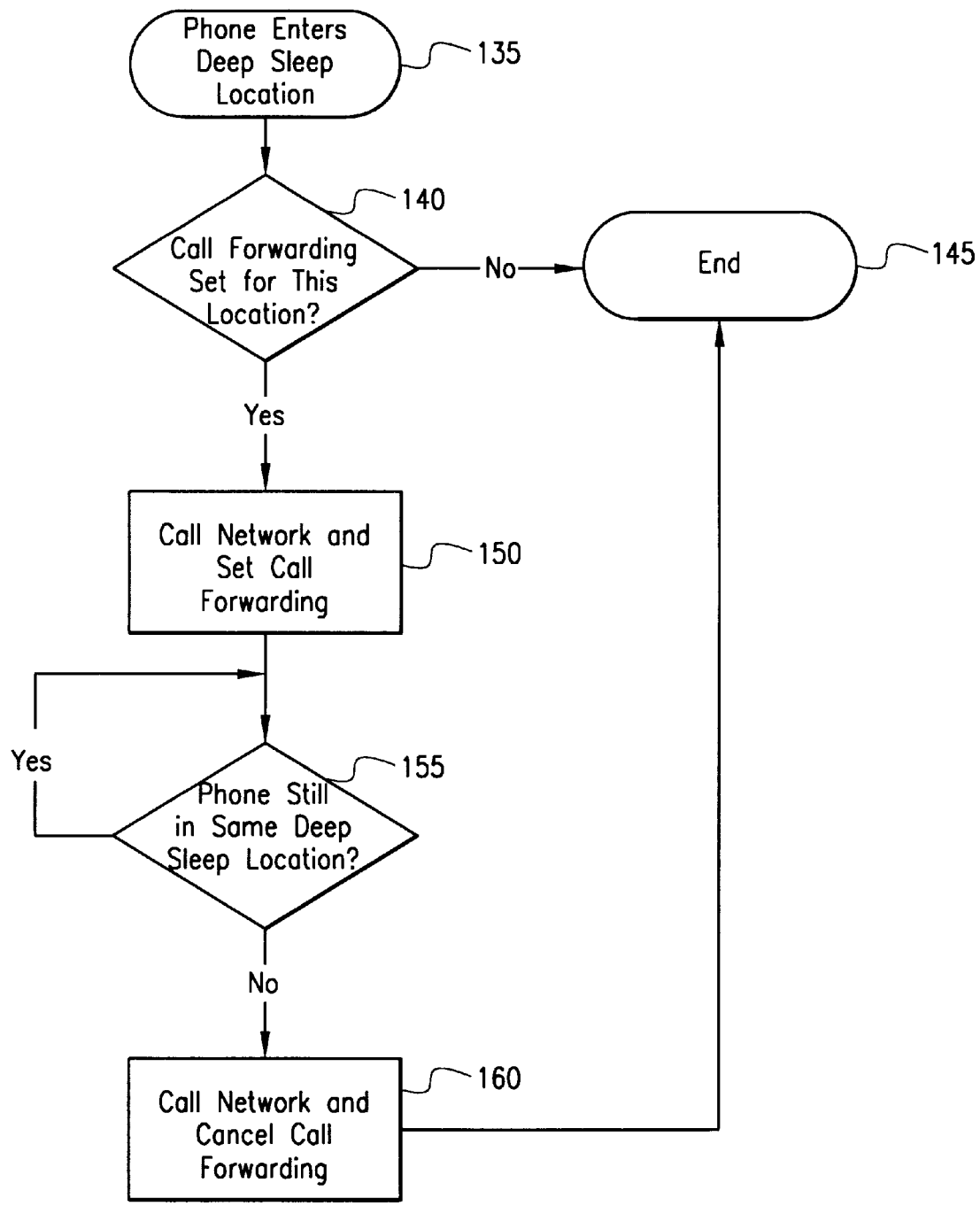
FIG. 5 is a flow diagram illustrating the implementation of a call forwarding functionality in combination with the deep-sleep mode of operation.

Referring now to FIG. 5, a flow diagram more fully illustrates the call forwarding function of the invention. Once the mobile telephone 10 enters a deep-sleep location at step 135, inquiry step 140 determines whether the call forwarding function 130 has set a call forwarding condition for this location. If not, the process ends at step 145. Otherwise, the mobile telephone 10 calls the associated service provider at step 150 and sets call forwarding to the deep-sleep location telephone number indicated by the user. Inquiry step 155 monitors the location of the mobile telephone 10 using the location circuitry 45 to determine whether the mobile telephone still resides in the same deep-sleep location. If so, inquiry step 145 continues monitoring. Once the mobile telephone leaves the deep-sleep location, the service provider is contacted at step 160 to cancel the call forwarding service. The process then ends at step 145.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for saving power within a mobile telephone, comprising the steps of:
   determining coordinates of a present position of the mobile telephone; and
   storing the coordinates in a memory associated with the mobile telephone as at least one predetermined location;
   determining whether the current location of the mobile telephone is within a selected distance of the at least one predetermined location; and
   operating the mobile telephone according to a first mode of operation when the mobile telephone is within the selected distance of the at least one predetermined location and according to a second mode of operation when the mobile telephone is not within the selected distance of the at least one predetermined location, wherein the first mode of operation uses less power than the second mode of operation.

2. The method of claim 1 further including the step of periodically repeating the steps of determining the location of the mobile telephone and operating the mobile telephone.

3. The method of claim 1, wherein the step of establishing further comprises the steps of:
   determining coordinates of a present position of the mobile telephone; and
   storing the coordinates in a memory associated with the mobile telephone as the at least one predetermined location.

4. The method of claim 1, wherein the step of determining further comprises the steps of:
   determining coordinates of a present position of the mobile telephone; and
   comparing the determined coordinates with the stored coordinates to determine if the mobile telephone is within a selected distance of the stored coordinates.

5. The method of claim 1 further including the step of switching the first mode of operation from an operating to a non-operating state.

6. The method of claim 1 further including the steps of:
   storing at least one base station identifier for a base station serving the at least one predetermined location;
   determining whether the base station identifier of the base station currently serving the mobile telephone matches the at least one base station identifier serving the at least one predetermined location; and
   operating the mobile telephone according to the second mode of operation if the base station identifier for the base station currently serving the mobile telephone matches none of the at least one base station identifier serving the at least one predetermined location.

7. The method of claim 1 further including the step of:
   setting up call forwarding to a selected number upon entry into the first mode of operation.

8. The method of claim 7 further including the steps of:
   monitoring for entry into the second mode of operation; and
   canceling the call forwarding upon entry into the second mode of operation.

9. A mobile telephone, comprising:
   a memory for storing at least one user selected location;
   first circuitry for determining a present location of the mobile telephone and storing the present position as the at least one user selected location;
   second circuitry for determining a location of the mobile telephone and for comparing the location of the mobile telephone to the at least one user selected location to determine if the mobile telephone is within a selected distance of the at least one user selected location;
   third circuitry for operating the mobile telephone according to a first mode of operation if the location of the mobile telephone is within a selected distance of the at least one user selected location and according to a second mode of operation when the location of the mobile telephone is not within a selected distance of the at least one user selected location, wherein the first mode of operation uses less power than the second mode of operation.

10. The mobile telephone of claim 9 further including a timer for initiating periodic determinations of the location of the mobile telephone by the first circuitry.

11. The mobile telephone of claim 9 further including means for activating and deactivating the first mode of operation.

12. The mobile telephone of claim 9, wherein the second circuitry further enables entry of the location of the mobile telephone into the memory at the at least one selected location.

13. The mobile telephone of claim 9, wherein the memory further stores base station identifiers associated with the at least one user selected location.

14. The mobile telephone of claim 13, wherein the third circuitry further operates the mobile telephone according to the second mode of operation when an identifier of a base station currently serving the mobile telephone does not match an identifier stored in the memory.

15. The mobile telephone of claim 9 further including means for initiating call forwarding to a selected number when the mobile telephone enters the first mode of operation.

16. A method for saving battery power within a mobile telephone, comprising the steps of:
   storing at least one predetermined location within a memory;
   storing at least one base station identifier serving the at least one predetermined location within the memory;
   determining whether a base station identifier of a base station currently serving the mobile telephone matches the at least one base station identifier serving the at least one predetermined location;
   operating the mobile telephone according to a second mode of operation if the identifier of the base station currently serving the mobile telephone matches none of the at least one base station identifier serving the at least one predetermined location;
   determining a current location of the mobile telephone if the identifier of the base station currently serving the mobile telephone matches the at least one base station identifier serving the at least one predetermined location;
   comparing the current location with the predetermined location to determine if the mobile telephone is within a selected distance of the predetermined location; and
   operating the mobile telephone according to a first mode of operation when the mobile telephone is within the selected distance of the at least one predetermined location and according to the second mode of operation when the mobile telephone is not within the selected distance of the at least one predetermined location, wherein the first mode of operation uses less power than the second mode of operation.

17. The method of claim 16, wherein the step of storing at least one predetermined location further comprises the steps of:

determining coordinates of a present position of the mobile telephone; and storing the coordinates in the memory at the at least one predetermined location.

18. The method of claim 16 further including the step of switching the first mode of operation from an operating to a non-operating state.

19. The method of claim 16 further including the step of:

setting up call forwarding to a selected number upon entry into the first mode of operation.

20. The method of claim 19 further including the steps of:

monitoring for entry into the second mode of operation from the first mode of operation; and canceling the call forwarding upon entry into the second mode of operation.

* * * * *